US011240689B1

(12) United States Patent
Shankaranarayanan et al.

(10) Patent No.: US 11,240,689 B1
(45) Date of Patent: Feb. 1, 2022

(54) AUTOMATED CELL PARAMETER UPDATE IN CELLULAR NETWORKS

(71) Applicants: AT&T Intellectual Property I, L.P., Atlanta, GA (US); AT&T Mobility II LLC, Atlanta, GA (US)

(72) Inventors: Nemmara Shankaranarayanan, Bridgewater, NJ (US); Wei Yuan, Frisco, TX (US); Sarat Puthenpura, Berkeley Heights, NJ (US); Slawomir Stawiarski, Carpentersville, IL (US); Shomik Pathak, Richardson, TX (US); Wenjie Zhao, Princeton, NJ (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 17/069,578

(22) Filed: Oct. 13, 2020

(51) Int. Cl.
*H04W 24/02* (2009.01)
*H04W 76/11* (2018.01)

(52) U.S. Cl.
CPC .......... *H04W 24/02* (2013.01); *H04W 76/11* (2018.02)

(58) Field of Classification Search
CPC ....... H04W 4/02; H04W 76/11; H04W 74/06; H04W 74/0816; H04W 74/0825; H04W 74/0841; H04W 74/085; H04W 74/0858; H04W 74/00; H04W 74/02; H04W 74/006; H04W 88/00; H04W 88/02; H04W 88/08; H04W 88/18; H04W 4/029; H04W 36/20; H04W 36/22; H04W 40/00; H04W 40/02; H04W 40/04; H04W 40/16; H04W 40/12; H04W 40/08; H04W 40/18; H04W 40/20; H04W 52/243; H04W 52/244; H04W 72/08; H04W 72/082; H04W 72/085; H04W 72/10; H04W 72/04; H04W 76/00; H04W 76/10; H04W 76/16; H04W 76/20; H04W 24/00; H04W 24/02; H04W 24/04
See application file for complete search history.

(56) References Cited

U.S. PATENT DOCUMENTS

| | | | |
|---|---|---|---|
| 2011/0038326 A1* | 2/2011 | Davies et al. | 370/329 |
| 2012/0252459 A1* | 10/2012 | Yu et al. | 455/436 |
| 2012/0281573 A1* | 11/2012 | Kazmi et al. | 370/252 |
| 2013/0150056 A1* | 6/2013 | Yi et al. | H04W 36/04 |
| 2014/0120895 A1* | 5/2014 | Moe et al. | H04W 24/02 |
| 2014/0335874 A1* | 11/2014 | Bakker et al. | H04W 76/021 |
| 2016/0212632 A1* | 7/2016 | Katamreddy et al. | H04W 24/02 |
| 2017/0359737 A1* | 12/2017 | Singh et al. | H04W 24/02 |

OTHER PUBLICATIONS

"5G—OOF (ONAP Optimization Framework) and PCI (Physical Cell ID) Optimization Skip to end of metadata," https://wiki.onap.org/display/DW/5G+-+OOF+%28ONAP+Optimization+Framework%29+and+PCI+%28Physical+Cell+ID%29+-Optimization, 5 pages.

* cited by examiner

Primary Examiner — Meless N Zewdu
(74) Attorney, Agent, or Firm — Amin, Turocy & Watson, LLP

(57) ABSTRACT

The described technology is generally directed towards automated cell parameter updates in cellular networks. A network automation platform architecture is disclosed which includes elements configured to automatically analyze, recalculate, and deploy cell parameters such as PCI and RSI parameters, for cells of a cellular communication network.

20 Claims, 11 Drawing Sheets

AUTOMATED CELL PARAMETER UPDATE IN CELLULAR NETWORKS

TECHNICAL FIELD

The subject application is related to fifth generation (5G) and subsequent generation cellular communication systems.

BACKGROUND

In cellular communication networks, Physical Cell Identifiers (PCIs) are used to identify network cells in the physical layer. Typically, there are a limited total number of available PCI values, and therefore PCIs are reused in the network. If PCI assignments are poorly planned, there is a risk of PCI conflicts in which a same PCI is assigned to two or more neighbor cells. Another problem that can arise is PCI confusion, in which a first cell has two or more neighbor cells to which a same PCI is assigned.

Another parameter assigned to network cells is the root sequence index (RSI). The RSI is used in connection with random access channel (RACH) communications, which establish connections between user equipment and the cellular communications network. Like the PCI, there are a limited total number of available RSI values, and so both RSI conflicts and RSI confusion can occur in cellular communication networks.

Fifth Generation (5G) wireless networks introduce improved automation capabilities, including self-organizing networks (SON) and improved automation platforms, such as the various releases of the open network automation platform (ONAP®) project. However, leveraging these relatively new capabilities for automation of many network functions, including PCI and RSI assignments at scale, remains an open problem.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
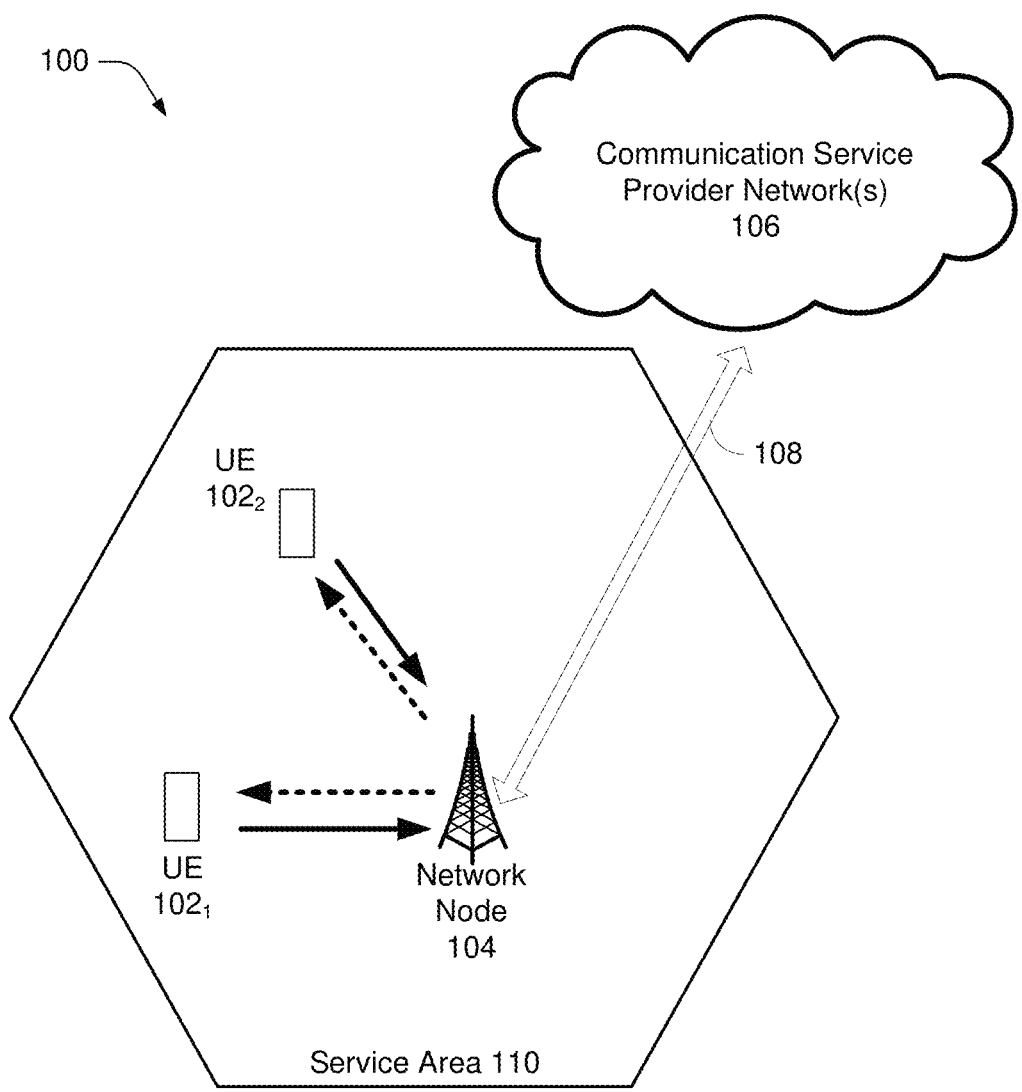
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards automated cell parameter updates in cellular networks. A network automation platform architecture is disclosed which includes elements configured to automatically receive, process, and re-deploy cell parameters such as PCI and RSI parameters, for cells of a cellular communication network. In general, a network automation platform can periodically receive cell data updates comprising, inter alia, updated PCIs and RSIs. The cell data updates can be received from an element management system (EMS) which is coupled with radio access network (RAN) elements. The network automation platform can analyze cell data updates to identify PCI and RSI collisions and confusion, and the network automation platform can determine replacement PCIs and RSIs as needed. The network automation platform can communicate the replacement PCIs and RSIs to the EMS, in order to configure the network cells with the replacement PCIs and RSIs, thereby avoiding the collision or confusion problems.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 1021, 1022, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
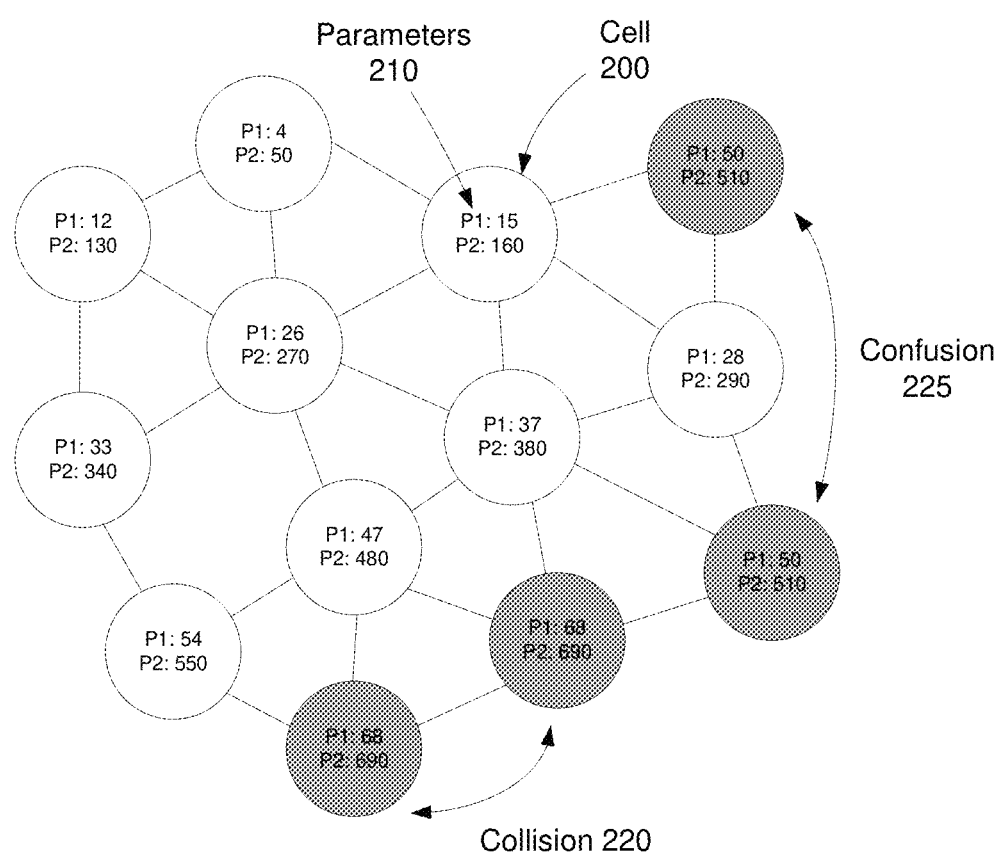
FIG. 2 illustrates an example parameter collision and an example parameter confusion in a cellular communication network, in accordance with various aspects and embodiments of the subject disclosure.

FIG. 2 illustrates an example parameter collision and an example parameter confusion in a cellular communication network, in accordance with various aspects and embodiments of the subject disclosure. FIG. 2 comprises multiple circles, each of which represents an example cell of a cellular communication network. The circles are connected by lines indicating neighbor relationships between the cells. Circles connected by a line are neighbor cells. Each of the cells is configured with example P1 and P2 parameters. Therefore, example cell 200 comprises parameters 210, including a P1 parameter with a value of 15, and a P2 parameter with a value of 160. In FIG. 2, the P1 parameters can represent, e.g., PCI parameters, and the P2 parameters can represent, e.g., RSI parameters.

It can be appreciated that FIG. 2 is a simplified representation, and cellular communication networks can comprise more or fewer cells than illustrated in FIG. 2, each of which can be configured with more than the illustrated parameters. While this disclosure uses PCI and RSI parameters as an example, and while the disclosed techniques are useful in connection with PCI and RSI parameters, the disclosed structures and techniques can also potentially be used in connection with other parameters, and this disclosure is not limited to applications involving PCI and RSI parameters.

In an example parameter collision 220, neighbor cells can use a same parameter. For example, the cells involved in the collision 220 both use a same P1 (PCI) parameter, resulting in a P1 collision. Furthermore, the cells involved in the collision 220 both use a same P2 (RSI) parameter, resulting in a P2 collision. A collision can comprise a collision of one parameter, e.g., P1 or P2, without collision of multiple parameters. Multiple parameter collisions such as illustrated in FIG. 2 are also possible. Collisions of multiple parameters can be considered multiple collisions, and multiple parameter collisions can be less likely than collisions of just one parameter, as may be expected.

In an example parameter confusion 225, a first cell can comprise at least two neighbor cells which use a same parameter. For example, the cells involved in the confusion 225 are both neighbors of a first cell (namely, the cell that uses P1: 28 and P2:290). The cells involved in the confusion 225 both use a same P1 (PCI) parameter, resulting in a P1 confusion. Furthermore, the cells involved in the confusion 225 both use a same P2 (RSI) parameter, resulting in a P2 confusion. As described above with regard to collisions, a parameter confusion can comprise a confusion of one parameter, e.g., P1 or P2, without confusion of multiple parameters, and multiple parameter confusions such as illustrated in FIG. 2 is also possible. Confusion of multiple parameters can be considered multiple confusions, and can be less likely than confusions of just one parameter.

Figure 3:
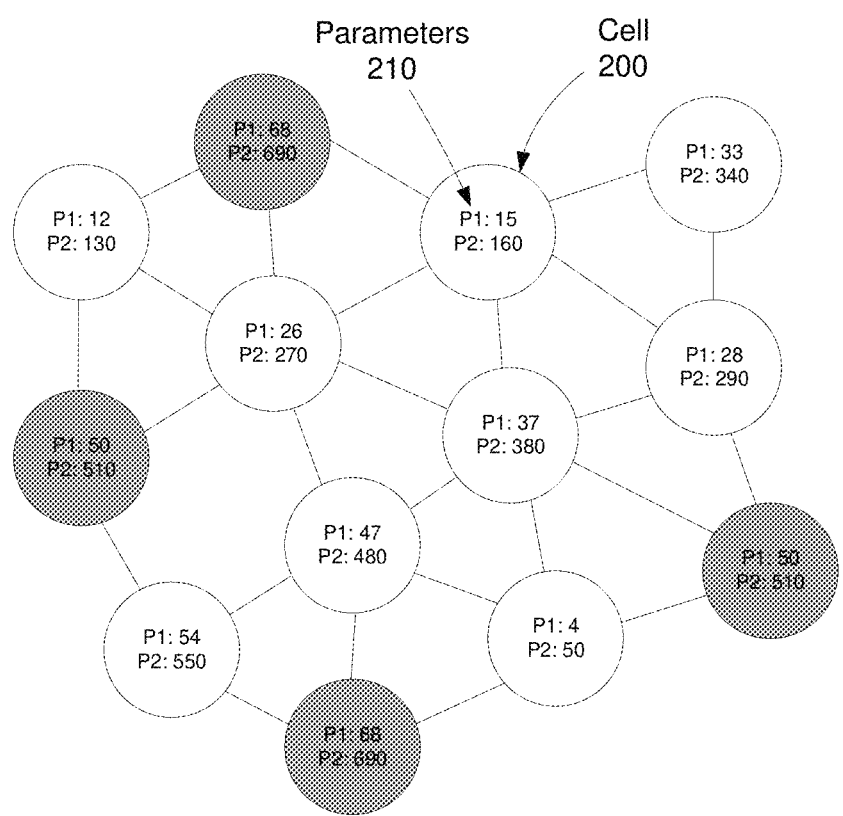
FIG. 3 illustrates an example solution to the parameter collision and parameter confusion introduced in FIG. 2, in accordance with various aspects and embodiments of the subject disclosure.

FIG. 3 illustrates an example solution to the parameter collision and parameter confusion introduced in FIG. 2, in accordance with various aspects and embodiments of the subject disclosure. FIG. 3 comprises the same cellular communication network, including the same cells, as illustrated in FIG. 2. However, parameters have been reassigned to avoid the parameter collision and the parameter confusion illustrated in FIG. 2. As shown in FIG. 3, parameter values for one of the cells involved in the collision 220 have been reassigned to another cell, in order to avoid the collision 220. Likewise, parameter values for one of the cells involved in the confusion 225 have been reassigned to another cell, in order to avoid the confusion 225.

In scenarios involving collision or confusion of one parameter, instead of multiple parameters, the one parameter can be modified to avoid the collision or confusion, while other parameters need not be modified. Furthermore, while FIG. 3 illustrates reassigning parameters to different cells to avoid the collision 220 and the confusion 225, embodiments can alternatively recalculate parameters for the cells involved in the collision 220 or the confusion 225, without necessarily reassigning parameters to different cells in the cellular communication network. This disclosure uses the term "replacement parameter" to refer to a parameter that replaces a previous parameter assigned to a cell. For example, in FIG. 3, the replacement parameters for the cell involved in the collision 220 shown in FIG. 2 are P1: 4 and P2: 50.

Figure 4:
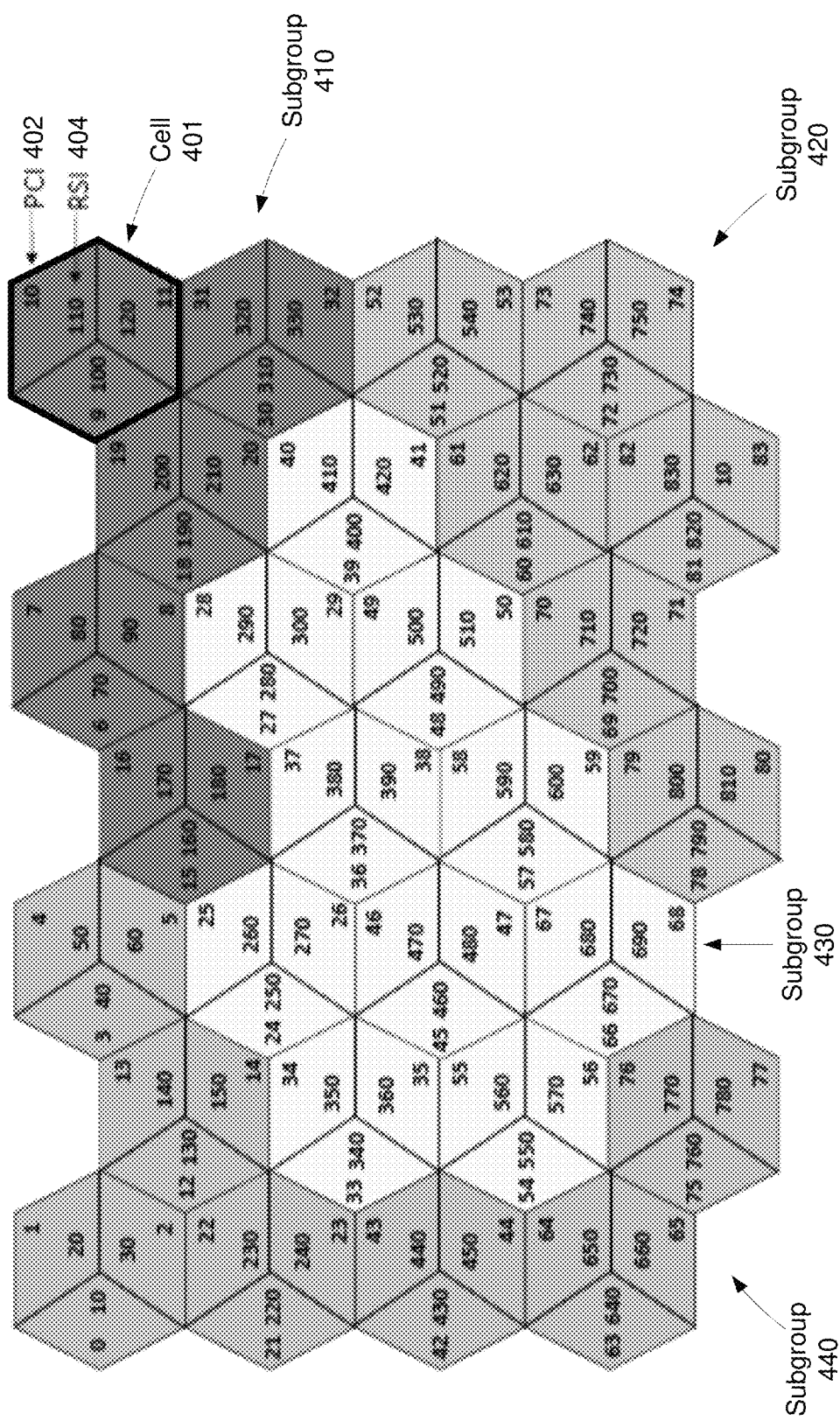
FIG. 4 illustrates parameters assigned to cells of a cellular network, in accordance with various aspects and embodiments of the subject disclosure.

FIG. 4 illustrates parameters assigned to cells of a cellular network, in accordance with various aspects and embodiments of the subject disclosure. In FIG. 4, each cell is represented by a hexagonal shape, such as example cell 401. Furthermore, values of parameters assigned to the cells, and portions of cells, are indicated in each cell. Parameter values illustrated at the perimeter of each cell can comprise PCI parameters, such as example PCI 402. Parameter values illustrated at the middle of each cell can comprise RSI parameters, such as example RSI 404.

FIG. 4 furthermore illustrates subgroups of cells, indicated by shading. The illustrated subgroups include subgroup 410, subgroup 420, subgroup 430, and subgroup 440. Cells in a cellular communication network can be grouped into subgroups which can be managed separately in some embodiments. For example, a subgroup can be managed by assigning parameters to cells on a per-subgroup basis. In an example scenario, different geographical areas, e.g. different cities, also referred to as different markets, can be associated with different cell subgroups.

Figure 5:
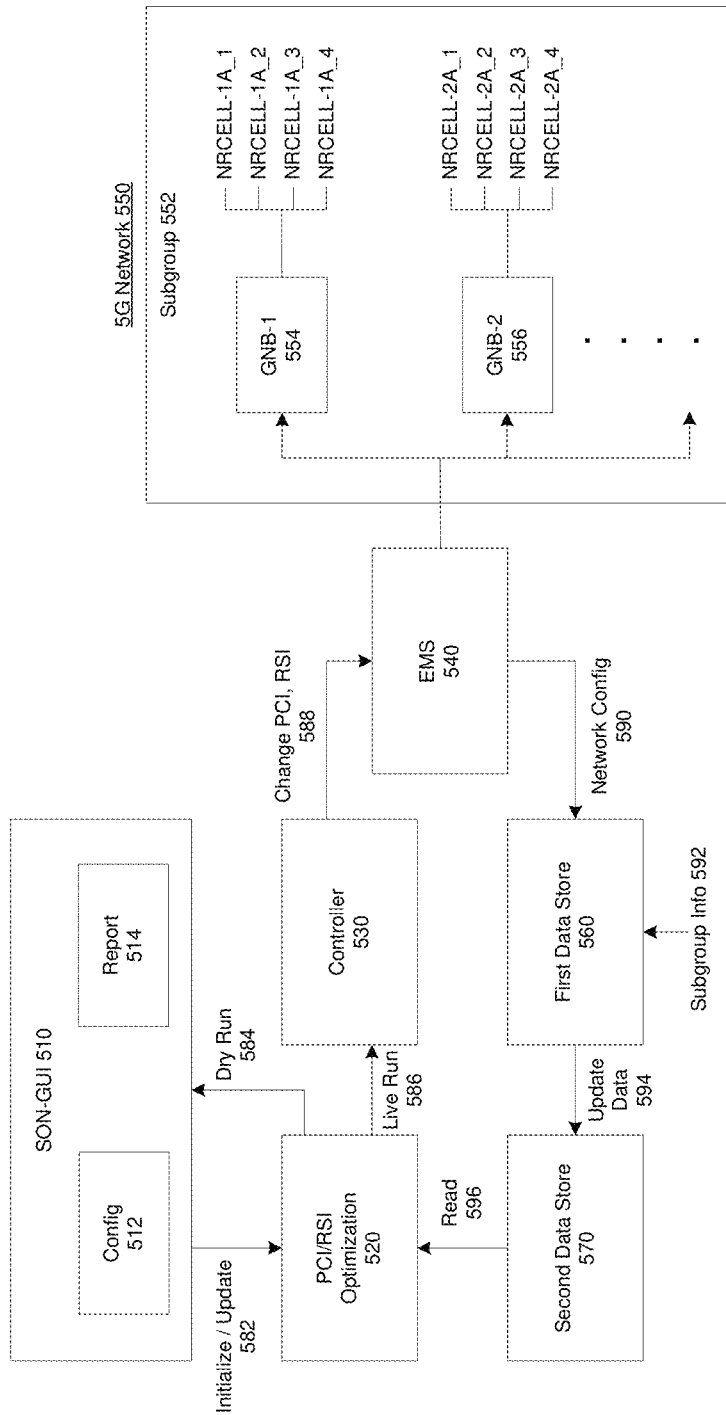
FIG. 5 illustrates an example parameter assignment automation work flow, in accordance with various aspects and embodiments of the subject disclosure.

FIG. 5 illustrates an example parameter assignment automation work flow, in accordance with various aspects and embodiments of the subject disclosure. FIG. 5 comprises self-organizing network (SON) graphical user interface (GUI) 510, PCI/RSI optimization 520, controller 530, element management system (EMS) 540, first data store 560, second data store 570, and 5G network 550. The SON-GUI 510 comprises config 512 and report 514. The 5G network 550 comprises a subgroup 552. Subgroup 552 comprises a subgroup of cells, wherein each cell in the subgroup is associated with a network node, such as GNB-1 554, GNB-2 556, etc.

Figure 6:
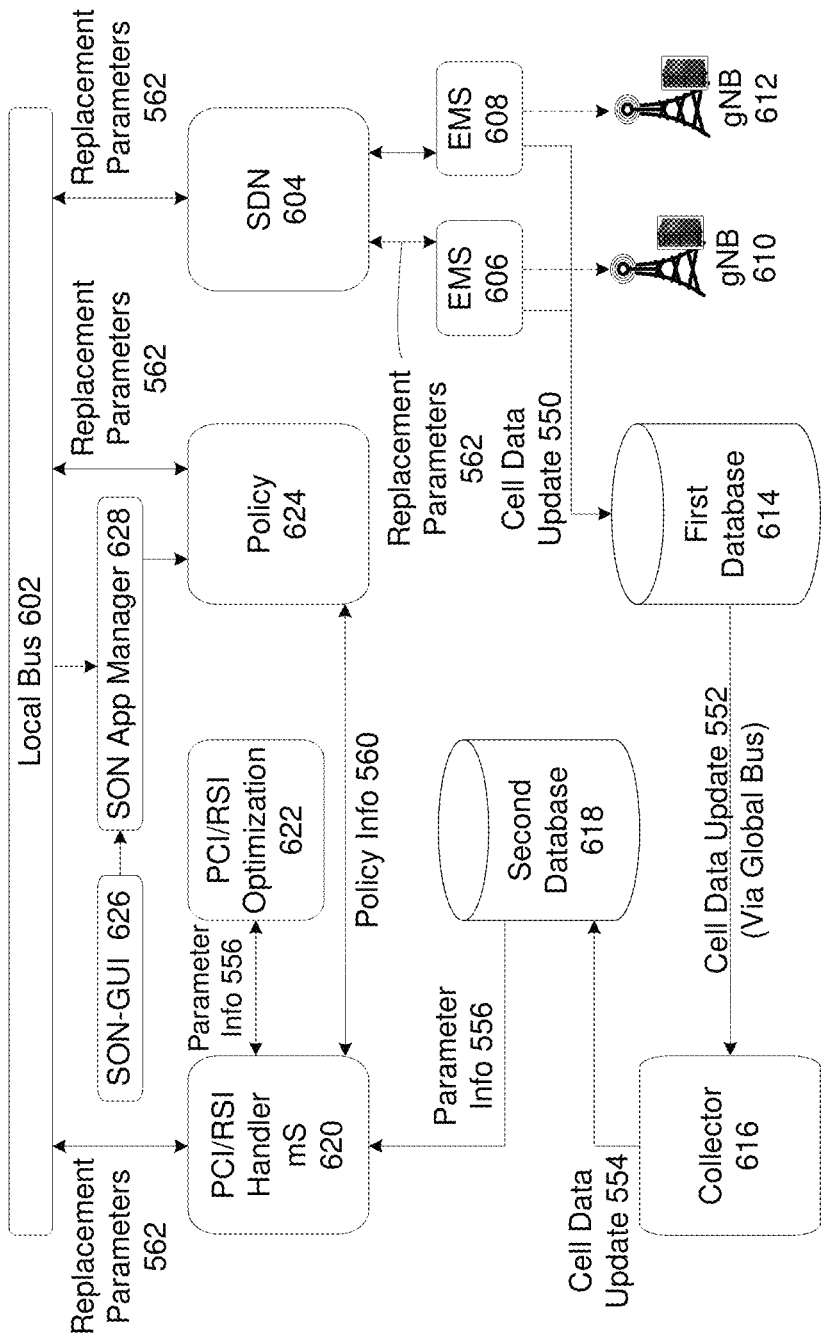
FIG. 6 illustrates an example network automation platform architecture, in accordance with various aspects and embodiments of the subject disclosure.

In an example embodiment, the network nodes GNB-1 554 and GNB-2 556 can comprise network nodes such as network node 104 introduced in FIG. 1. The various other components illustrated in FIG. 5 can be included in the communication service provider network(s) 106 introduced in FIG. 1. In particular, operations/components in FIG. 5 can be included in, or else can interact with, a network automation platform for communication service provider network(s) 106, such as network automation platforms designed in connection with the ONAP® project. FIG. 6 illustrates an example network automation platform architecture which can implement the components and workflow illustrated in FIG. 5.

In an example parameter assignment automation work flow according to FIG. 5, config 512 elements of the SON-GUI 510 can be used to initialize/update 582 a workflow cycle and workflow properties. For example, config 512 can be used to set at time at which an automation workflow cycle is performed, and config 512 can configure subgroup selections, in order to control which of cells of the 5G network 550 will be processed according to the automation workflow. Config 512 can optionally be used to set parameter ranges, e.g., ranges of values that can be used for PCI and/or RSI parameters. Config 512 can furthermore optionally be used to flag certain subgroups, e.g., subgroup 552, for special attention or processing. Config 512 can furthermore optionally be used to "blacklist" certain network nodes, thereby removing the blacklisted network nodes from automated parameter assignment or otherwise disallowing cell parameter changes for certain cells or network nodes.

In FIG. 5, a dry-run can comprise operations performed when the illustrated automated system is active and it processes data from network 550 and calculates a suggested solution comprising replacement parameters; however, the replacement parameters are not implemented in the network 550, so the network 550 PCI and RSI parameters remain unchanged.

In contrast, a live-run can comprise operations performed when the automated system is active and it processes data from network 550 and calculates a suggested solution comprising replacement parameters which are implemented in the network 550, so the network 550 PCI and RSI parameters are changed.

In a dry run 584, PCI/RSI optimization 520 can calculate PCI/RSI parameters for network nodes GNB-1 554, GNB-2 556, etc., and the calculated PCI/RSI parameters can be reported back to SON-GUI 510, without deploying the calculated PCI/RSI parameters to the 5G network 550. Report 514 can be used generate a report comprising calculated PCI/RSI parameters for network nodes GNB-1 554, GNB-2 556, etc., for use in testing and troubleshooting.

In a live run 586, PCI/RSI optimization 520 can read 596, from second data store 570, updated cell data comprising PCI/RSI parameters assigned to network nodes GNB-1 554, GNB-2 556, etc. The read 596 can be initiated at a start time configured via config 512. The read 596 can optionally be limited to network nodes associated with a particular subgroup 552. PCI/RSI optimization 520 can then analyze the updated cell data, e.g., to identify parameter collisions, parameter confusion, or other problems in parameter assignments. PCI/RSI optimization 520 can determine replacement parameters for network nodes GNB-1 554, GNB-2 556, etc., as needed to avoid any identified parameter collisions or parameter confusion. PCI/RSI optimization 520 can generate an output comprising replacement parameters for network nodes GNB-1 554, GNB-2 556, etc. PCI/RSI optimization 520 can provide the output to the controller 530 as part of live run 586. Furthermore, PCI/RSI optimization 520 and/or the controller 530 can provide calculated replacement parameters to the SON-GUI 510 so that the live run output can be reported via report 514. In some embodiments, PCI/RSI optimization 520 can provide its output to the controller 530 during a scheduled maintenance window time period, e.g., between 12 AM and 4 AM each day, or during any desired scheduled maintenance window, which can optionally be configured via config 512.

The controller 530 can provide parameter replacement values, also referred to in FIG. 5 as change PCI, RSI 588, to EMS 540. The EMS 540 can subsequently provision the network nodes GNB-1 554, GNB-2 556, etc., with the parameter replacement values.

In order to supply the PCI/RSI optimization 520 with updated cell data in the second data store 570, which the PCI/RSI optimization 520 can use to calculate replacement parameters, the EMS 540 can collect cell data updates, comprising parameters assigned to network nodes GNB-1 554, GNB-2 556, etc., from the 5G network 550. The EMS 540 can supply a network config 590, comprising the cell data updates, to the first data store 560. Data in the first data store 560 can be organized, e.g., to reflect cell subgroups, by providing subgroup info 592 to the first data store 560. In an embodiment, the first data store 560 can comprise, e.g., a network database which is not included in a network automation platform. Update data 594 can be provided to second data store 570, wherein second data store 570 can be implemented as part of the network automation platform. The update data 594 can update the second data store 570 to include updated information regarding parameters assigned to various network nodes GNB-1 554, GNB-2 556, etc., of the various subgroups such as subgroup 552 of the 5G network 550. In an embodiment, time(s) of day at which cell data updates can be periodically provided by EMS 540 to first data store 560, and subsequently to second data store 570, can be configurable via config 512.

FIG. 6 illustrates an example network automation platform architecture, in accordance with various aspects and embodiments of the subject disclosure. The illustrated network automation platform architecture can implement an automation workflow such as illustrated in FIG. 5. Furthermore, in some embodiments, the illustrated network automation platform can be implemented using network automation platforms such as those designed in connection with the ONAP® project, with modifications according to this disclosure. The illustrated network automation platform architecture can be included in communication service provider network(s) 106, such as illustrated in FIG. 1.

FIG. 6 comprises local bus 602, SON-GUI 626, SON application manager 628, PCI/RSI handler micro-service 620, PCI/RSI optimization 622, policy 624, software defined network (SDN) 604, second database 618, EMS 606, EMS 608, collector 616, first database 614, gNB 610 and gNB 612. In an example embodiment, the EMS 606, EMS 608, gNB 610, gNB 612, first database 614, and the SON-GUI 626 can optionally be implemented separately from the network automation platform, while the remaining elements illustrated in FIG. 6 can be included in the network automation platform. Furthermore, in some embodiments, elements of the illustrated network automation platform can optionally be implemented via a computing cluster, such as one or more of the clusters illustrated in FIG. 7.

In general, with regard to FIG. 6, embodiments can provide an automated solution to assign PCI/RSI parameters to 5G cells. PCI/RSI parameter assignment is important for 5G deployment at scale. Solutions can prevent customer-impacting network quality problems, e.g., cell attach and handover problems. An example solution can use a periodic (e.g., daily) 5G cell data feed from vendor EMS systems, received via a network database (first database 614). PCI/RSI optimization can be performed on a per-market basis, with a frequency selected to remove conflicts and increase reuse distance.

An architecture such as illustrated in FIG. 6 can support the following example high-level operation flows. First, Radio Access Network (RAN) operations of the network automation platform can interact with the illustrated automation solution via SON GUI 626, allowing SON GUI 626 to control providing parameters to the RAN, as well as to view reports showing RAN parameters.

Second, for new 5G cell activation, a cell (e.g., a cell associated with a gNB 610 or gNB 612) can be provisioned in an EMS 606 or 608. RAN operations of the network automation platform can assign out-of-range (OOR) values as needed for PCI/RSI.

Third, an automation solution can include a periodic (e.g., daily) update of 5G cell data from EMS 606, 608 via first database 614. The network automation platform can analyze PCI/RSI data included in the updated 5G cell data for OOR, collisions, and/or confusion. The network automation platform can calculate PCI/RSI optimizations (e.g., replacement parameters) for each sub-market or other subgroup of cells. Policy rules can be applied, and PCI/RSI configuration changes including replacement parameters can be sent to EMS 606, 608 during appropriate maintenance windows.

In another example operation of the network automation platform illustrated in FIG. 6, EMS 606, 608 can collect cell data updates, which include cell parameter values, from gNBs 610, 612. EMS 606, 608 can provide cell data updates, e.g., cell data update 550, to first database 614. The cell data update 550 can optionally be merged with additional data, e.g., cell subgroup data, at first database 614. A modified cell data update 552, including data from the cell data update 550, can be collected by collector 616, which can again optionally modify or reorganize the cell data update 552 and can provide an optionally modified cell data update 554, also including data from cell data update 550, to second database 618. The cell data update 554 can therefore include cell parameter information initially provided in cell data update 550.

The PCI/RSI Handler mS 620 can collect parameter information 556 from the second database 618. The PCI/RSI Handler mS 620 can use PCI/RSI optimization 622 to calculate replacement parameters 562 for cells of the 5G network, namely, the cells associated with the gNBs 610, 612. The PCI/RSI Handler mS 620 can also retrieve applicable policy info 560 from policy 624, and the PCI/RSI Handler mS 620 can apply the policies in connection with operation of PCI/RSI optimization 622. The PCI/RSI Handler mS 620 can provide replacement parameters 562 to local bus 602. Local bus 602 can comprise, e.g., a data movement as a platform (DMaaP) type bus.

Local bus 602 can optionally provide replacement parameters 562 to policy 624 for use in refining parameter calculation policies. Additionally, policy 624 can be configured in connection with SON-GUI 626 and, optionally, SON App Manager 628. By configuring policy 624, the SON-GUI 626 can be used to orchestrate timing and other configuration settings implemented by the network automation platform. Local bus 602 can furthermore provide replacement parameters 562 to SDN 604, and SDN 562 can then provide replacement parameters 562 to the EMS 606, 608.

Figure 7:
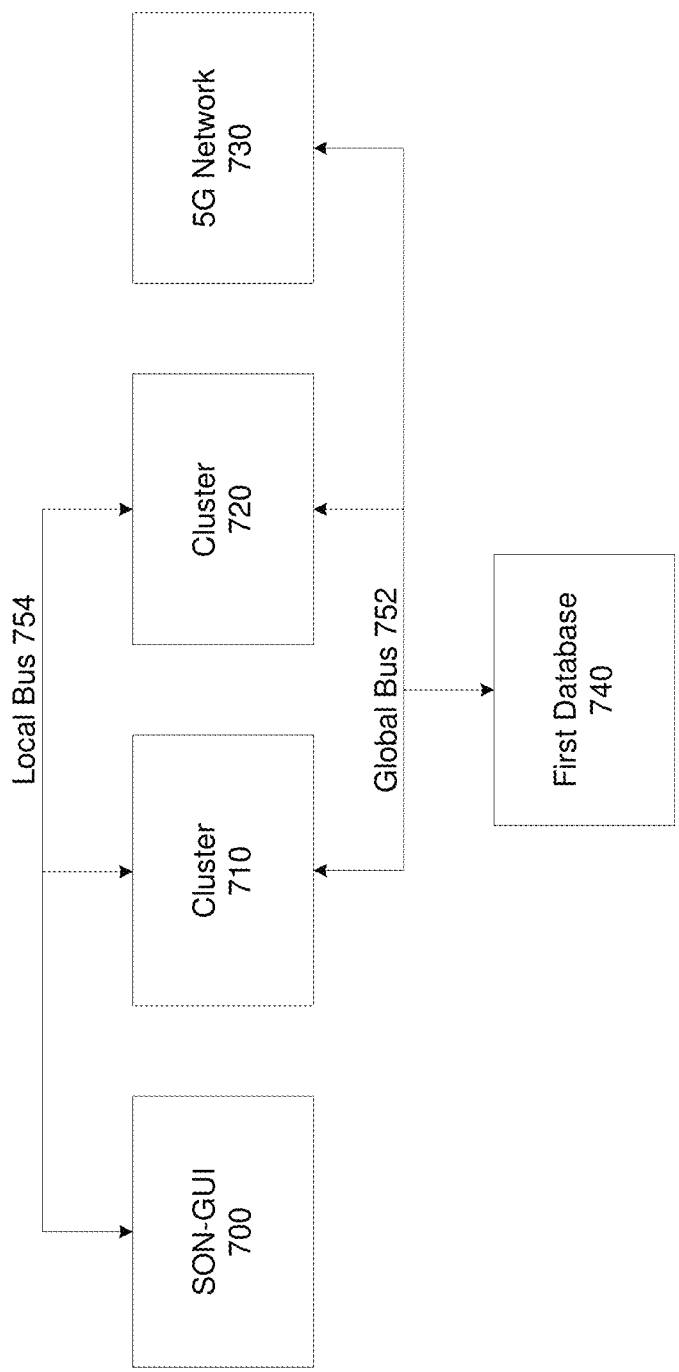
FIG. 7 illustrates an example arrangement of network components which can be used to provide a network automation platform, in accordance with various aspects and embodiments of the subject disclosure.

FIG. 7 illustrates an example arrangement of network components which can be used to provide a network automation platform, in accordance with various aspects and embodiments of the subject disclosure. FIG. 7 illustrates a SON-GUI 700, a cluster 710, and a cluster 720, all connected via a local bus 754. Furthermore, a first database 740, the cluster 710, the cluster 720, and a 5G network 730 are connected via a global bus 752. The SON-GUI 700, cluster 710, cluster 720, and first database 740 can be implemented for example in communication service provider network(s) 106, illustrated in FIG. 1. The 5G network 730 can include a RAN which includes network nodes such as network node 104.

In an example implementation, elements of a network automation platform such as illustrated in FIG. 6 can be implemented redundantly in multiple clusters 710 and 720. Embodiments can comprise additional clusters which also redundantly host elements of a network automation platform in some embodiments. The SON-GUI 700 can be used to configure the network automation platform elements at the multiple different clusters. The network automation platform at clusters 710 and 720 can automate and control operations of the 5G network 730 and the first database 740. For example, reporting of cell parameters from 5G network 730 to first database 740, as well as the subsequent calculation of replacement parameters and provisioning of the 5G network 730, can be controlled by the network automation platform at clusters 710 and 720.

Figure 8:
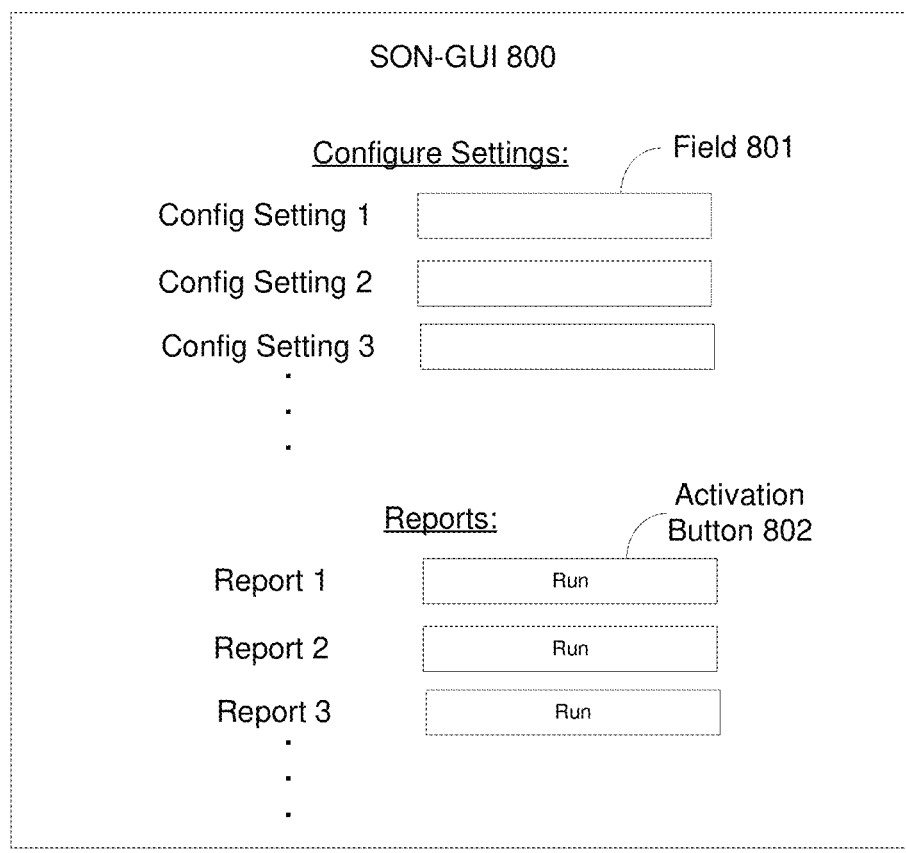
FIG. 8 illustrates an example user interface to configure operations of a network automation platform, in accordance with various aspects and embodiments of the subject disclosure.

FIG. 8 illustrates an example user interface to configure operations of a network automation platform, in accordance with various aspects and embodiments of the subject disclosure. FIG. 8 includes a SON-GUI 800, which can implement, e.g., the SON-GUI 510, 626, or 700 introduced in FIG. 5, FIG. 6, and FIG. 7. The SON-GUI 800 includes multiple configure settings, each having a field 801 which can receive an input. The SON-GUI 800 can configure a network automation platform according to received inputs. The SON-GUI 800 furthermore includes multiple report options, each of which includes an activation button 802 which can initiate collection and display of reporting data.

Features implemented via SON-GUI 800 can optionally be implemented on a per-subgroup basis, so that settings and controls at SON-GUI 800 can be applied to a selected subgroup of cells. Example features include, but are not limited to, overall features such as start/stop, daily automation start time, and selection of coefficients for prioritization. Start/stop can start and stop parameter recalculation, with the option of whether to send or not send replacement parameters to the RAN EMS. Daily automation start time can select times for various operations described herein, such as when cell update data is retrieved, when replacement parameters are recalculated, and when replacement parameters are sent to the RAN. Selection of coefficients for prioritization can allow, e.g., selection of coefficients such as p1, r1, p2, r2, p3, etc., for prioritization over other coefficients.

Example features can furthermore include "per band" features, e.g., selection of allocated PCI and RSI ranges. An allocated PCI range can comprise a range of values, such as 30 to 1007, or other range of allowed PCI values. An allocated RSI range can comprise, e.g., a range of values, as well as a selection of long or short for RSI sequences, and selection of an allowed RSI distance.

Example features can furthermore include "per subgroup" features, e.g., selection of subgroups to include or exclude in automation routines, mode selection (dry run versus live run), selection of a maximum number or percentage of cells for which replacement parameters can be calculated at a time, selection of a maintenance window time, and "blacklist" selections of gNBs for which cell parameters cannot be changed.

Figure 9:
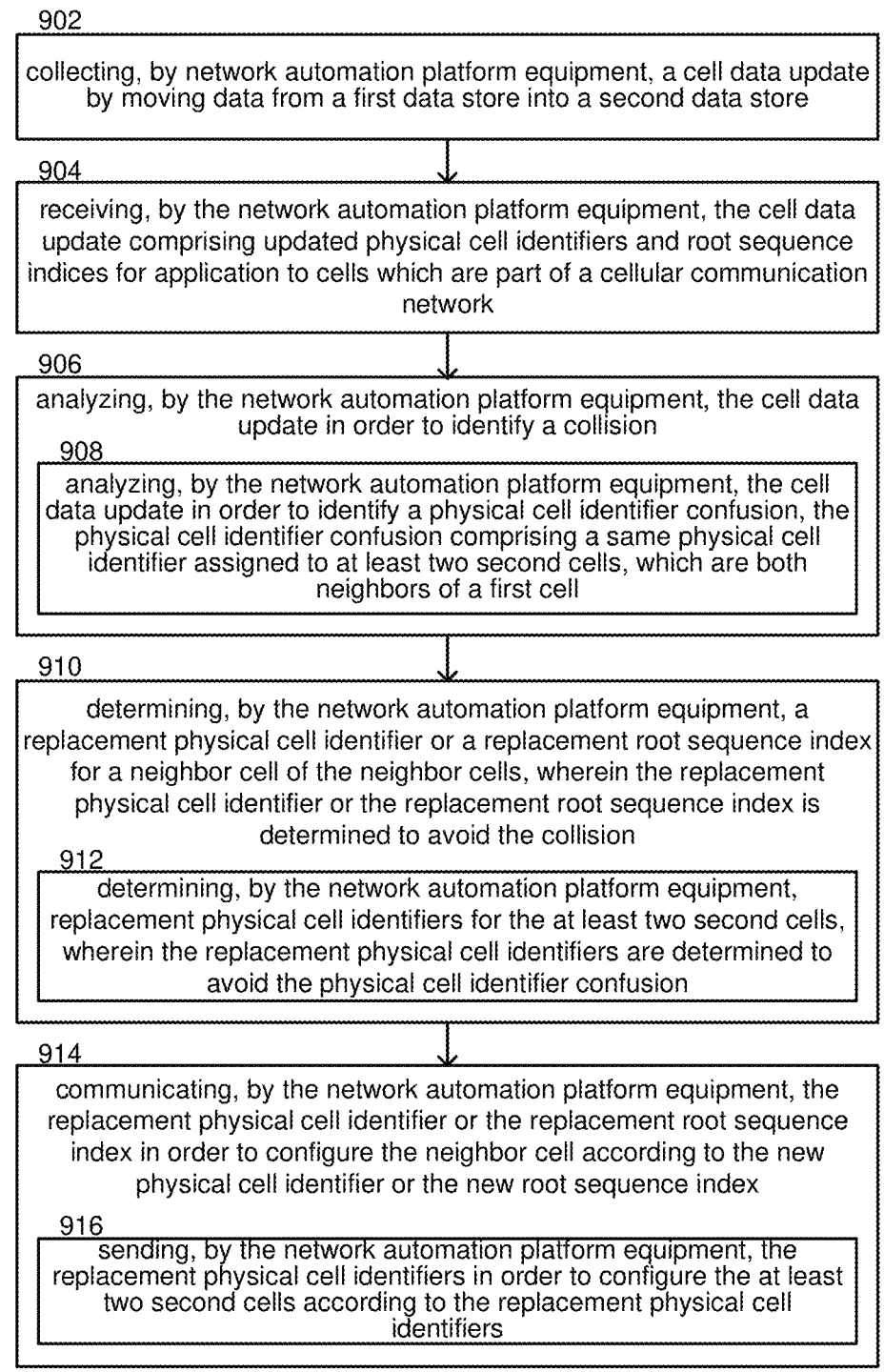
FIG. 9 is a flow diagram representing example operations of network automation platform equipment in connection with calculating replacement parameters for a cellular communication network, in accordance with various aspects and embodiments of the subject disclosure.

FIG. 9 is a flow diagram representing example operations of network automation platform equipment in connection with calculating replacement parameters for a cellular communication network, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network automation platform equipment implemented via a cluster, such as cluster 710 or 720, illustrated in FIG. 7, which can be configured to include a network automation platform according to the architecture illustrated in FIG. 6. In some embodiments, the operations illustrated in FIG. 9 can be performed repetitively or otherwise periodically, e.g., daily or according to any desired repeat period, in order to periodically correct collisions and/or confusion of cell parameters.

Example operation 902 comprises collecting, by the network automation platform equipment, a cell data update by moving data from a first data store into a second data store. For example, the collector 616 can move the cell data update 552/554 from the first database 614 to the second database 618. Example operation 902 comprises receiving, by the network automation platform equipment, the cell data update comprising updated physical cell identifiers and root sequence indices for application to cells which are part of a cellular communication network. For example, the cell data update 552/554 is received into the second database 618. The cell data update 552/554 can be received via an element management system, e.g., EMS 606, which is coupled with radio access network elements 610, 612 that are part of the cellular communication network. The cell data update 552/554 can also be received via a first data store such as first database 614, which stores the cell data update 550 from the element management system.

Example operation 906 comprises analyzing, by the network automation platform equipment, the cell data update in order to identify a collision. For example, the PCI/RSI Handler mS 620 in concert with the PCI/RSI Optimization 622 can analyze cell parameters to determine whether any collisions are present. The collision can comprise, e.g., a same physical cell identifier assigned to neighbor cells, or same root sequence index assigned to neighbor cells. An example collision 220 is illustrated in FIG. 2. The analyzing can comprise analyzing the cell data update 554 in the second data store, namely, the second database 618. Furthermore, the analyzing can comprise analyzing, by the network automation platform equipment, a portion of the cell data update 554 corresponding to a subgroup of the cells, to allow for parameter analysis on a per-subgroup basis, such as a per-market subgroup.

Example operation 906 can furthermore comprise operation 908 to identify parameter confusion. Example operation 908 comprises analyzing, by the network automation platform equipment, the cell data update in order to identify a physical cell identifier confusion, the physical cell identifier confusion comprising a same physical cell identifier assigned to at least two second cells, which are both neighbors of a first cell. Similarly, operation 908 can comprise analyzing the cell data update in order to identify a root sequence index confusion. An example confusion 225 is illustrated in FIG. 2. The PCI/RSI Handler mS 620 in concert with the PCI/RSI Optimization 622 can analyze cell parameters to determine whether any confusion is present.

Example operation 910 comprises determining, by the network automation platform equipment, a replacement physical cell identifier or a replacement root sequence index for a neighbor cell of the neighbor cells, wherein the replacement physical cell identifier or the replacement root sequence index is determined to avoid the collision. The determining can optionally comprise applying, by the network automation platform equipment, a stored policy rule. For example, the PCI/RSI Handler mS 620 in concert with the PCI/RSI Optimization 622 can determine replacement parameters which avoid collisions.

Example operation 910 can furthermore comprise operation 912 to determine replacement parameters to address parameter confusion identified at block 908. Example operation 912 comprises determining, by the network automation platform equipment, replacement physical cell identifiers for the at least two second cells identified pursuant to block 908, wherein the replacement physical cell identifiers are determined to avoid the physical cell identifier confusion. Likewise, operation 910 can comprise determining replacement root sequence indices presenting parameter confusion, for the at least two second cells identified pursuant to block 908. The PCI/RSI Handler mS 620 in concert with the PCI/RSI Optimization 622 can determine replacement parameters which avoid parameter confusion.

Example operation 914 comprises communicating, by the network automation platform equipment, the replacement physical cell identifier or the replacement root sequence index in order to configure the neighbor cell according to the new physical cell identifier or the new root sequence index. The communicating can comprise communicating the replacement physical cell identifier or the replacement root sequence index to an element management system, such as EMS 606 or 608. For example, replacement parameters 562 can be communicated via local bus 602 to SDN 604, which can provide the replacement parameters 562 to EMS 606 and/or 608.

Example operation 914 can furthermore comprise operation 916 to send replacement parameters determined pursuant to block 912. Example operation 916 comprises sending, by the network automation platform equipment, the replacement physical cell identifiers of block 912, in order to configure the at least two second cells of block 912 according to the replacement physical cell identifiers of block 912. Likewise, at operation 916, replacement root sequence indices that address parameter confusion problems can be sent out to avoid the parameter confusion.

Figure 10:
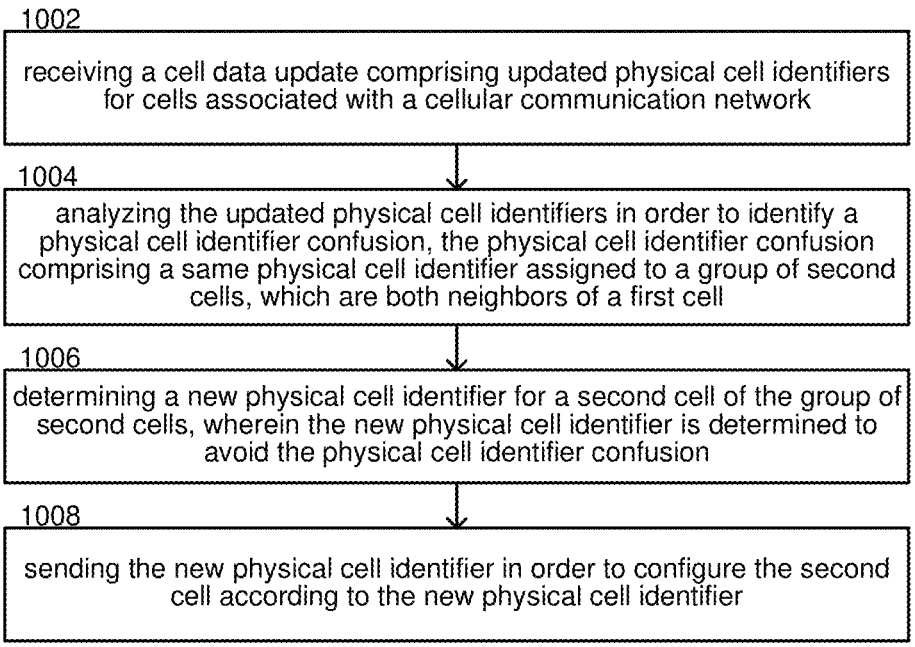
FIG. 10 is a flow diagram representing example operations of network automation platform equipment in connection with addressing a physical cell identifier confusion, in accordance with various aspects and embodiments of the subject disclosure.

FIG. 10 is a flow diagram representing example operations of network automation platform equipment in connection with addressing a physical cell identifier confusion, in accordance with various aspects and embodiments of the subject disclosure. Embodiments of FIG. 10 can optionally be adapted for root sequence index confusion. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by network automation platform equipment implemented via a cluster, such as cluster 710 or 720, illustrated in FIG. 7, which can be configured according to the architecture illustrated in FIG. 6. In some embodiments, the operations illustrated in FIG. 10 can be performed repetitively or otherwise periodically, at a reconfigurable automation start time, e.g., daily or according to any desired repeat period, in order to periodically correct collisions and/or confusion of cell parameters.

Example operation 1002 comprises receiving a cell data update comprising updated physical cell identifiers for cells associated with a cellular communication network. The cell data update can be received via an element management system coupled with radio access network elements associated with the cellular communication network, and a database to store the cell data update from the element management system.

Example operation 1004 comprises analyzing the updated physical cell identifiers in order to identify a physical cell identifier confusion, the physical cell identifier confusion comprising a same physical cell identifier assigned to a group of second cells, which are both neighbors of a first cell. In an embodiment, analyzing the updated physical cell identifiers in order to identify a physical cell identifier confusion can comprise analyzing a portion of the cell data update corresponding to a defined subgroup of the cells. The defined subgroup of the cells can comprise an included subgroup, wherein the subgroups are reconfigurably included or excluded for processing, e.g., via a SON-GUI.

Example operation 1006 comprises determining a new physical cell identifier for a second cell of the group of second cells, wherein the new physical cell identifier is determined to avoid the physical cell identifier confusion. A new PCI can be selected according to policies implemented at the network automation platform.

Example operation 1008 comprises sending the new physical cell identifier in order to configure the second cell according to the new physical cell identifier. Sending the new physical cell identifier can comprise, e.g., sending the new physical cell identifier to the element management system.

Figure 11:
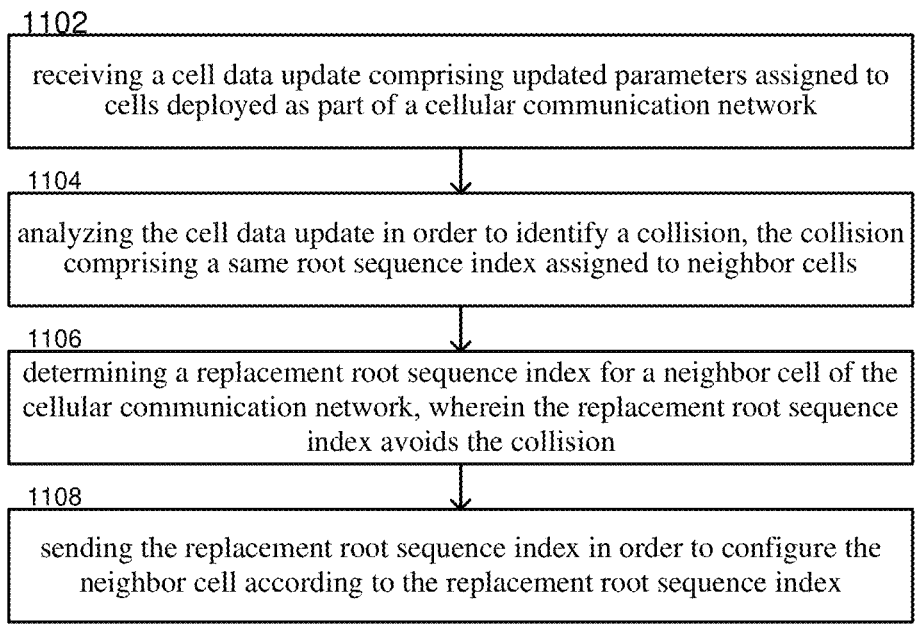
FIG. 11 is a flow diagram representing example operations of network automation platform equipment in connection with addressing a root sequence index collision, in accordance with various aspects and embodiments of the subject disclosure.

FIG. 11 is a flow diagram representing example operations of network automation platform equipment in connection with addressing a root sequence index collision, in accordance with various aspects and embodiments of the subject disclosure. Embodiments of FIG. 10 can optionally be adapted for physical cell identifier confusion. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 11 can be performed, for example, by network automation platform equipment implemented via a cluster, such as cluster 710 or 720, illustrated in FIG. 7, which can be configured according to the architecture illustrated in FIG. 6. The network automation platform equipment can be coupled via a local bus to other network automation platform equipment in a first cluster 710, and the network automation platform equipment can be coupled via a global bus to a second cluster 720 of network automation platform equipment, different than the first cluster 710. Functions of the first cluster 710 and the second cluster 720 can be configurable via a self-organizing network user interface 700. Furthermore, both the first cluster 710 and the second cluster 720 can be equipped to perform the operations of FIG. 11. The first cluster 710 and the second cluster 720 can comprise elements of the network automation platform illustrated in FIG. 6, such as the self-organizing network application manager 628 to coordinate operations according to network automation platform policy 624.

Example operation 1102 comprises receiving a cell data update 552 comprising updated parameters assigned to cells deployed as part of a cellular communication network 550. Example operation 1104 comprises analyzing the cell data update in order to identify a collision, the collision comprising a same root sequence index assigned to neighbor cells. The PCI/RSI Handler mS 620 in concert with the PCI/RSI Optimization 622 can perform operation 1104. Example operation 1106 comprises determining a replacement root sequence index for a neighbor cell of the neighbor cells of the cellular communication network, wherein the replacement root sequence index avoids the collision. The PCI/RSI Handler mS 620 in concert with the PCI/RSI Optimization 622 can perform operation 1106. Example operation 1108 comprises sending the replacement root sequence index in order to configure the neighbor cell according to the replacement root sequence index. The SDN 604 can perform operation 1108.

Figure 12:
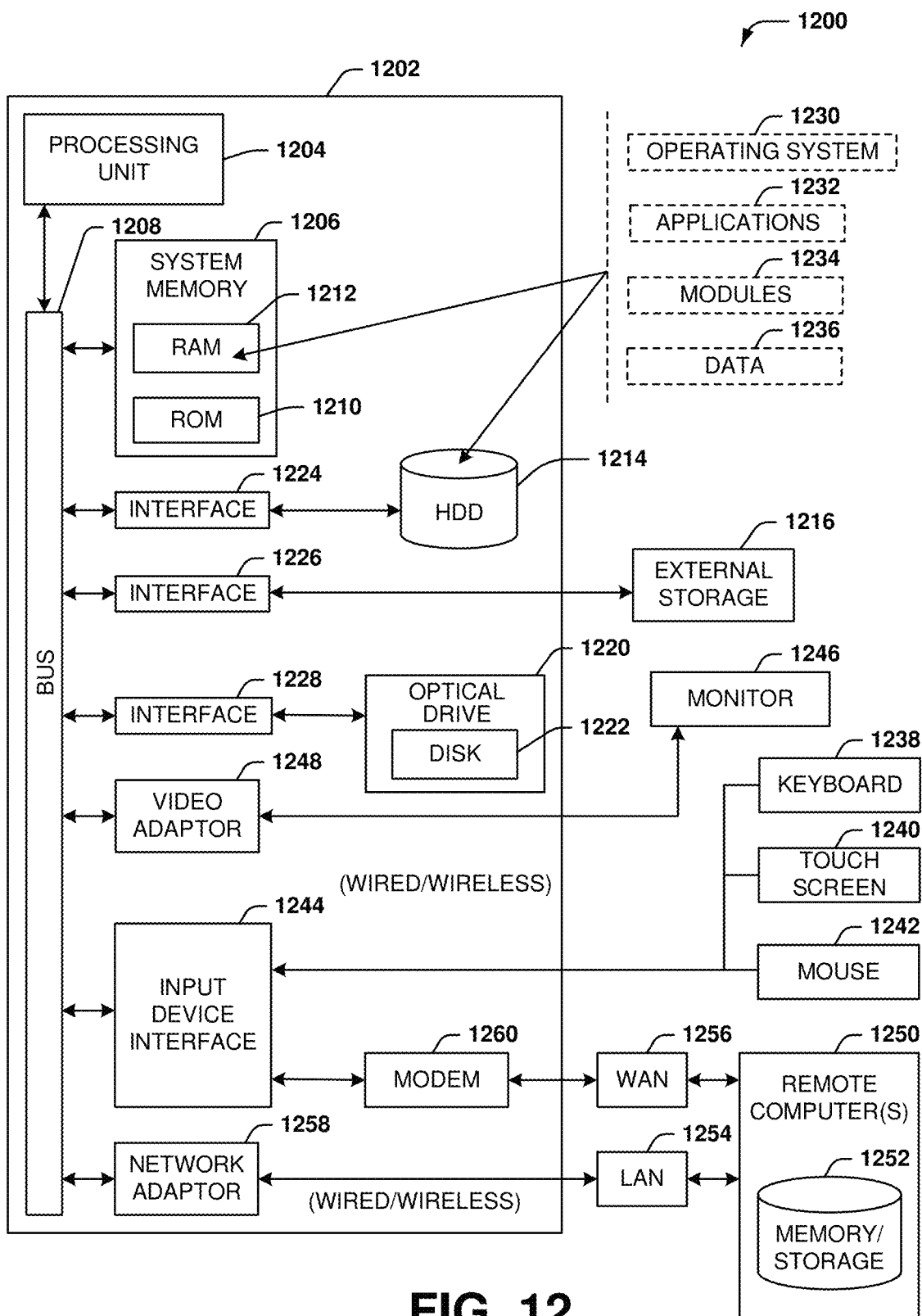
FIG. 12 is a block diagram of an example computer that can be operable to execute processes and methods in accordance with various aspects and embodiments of the subject disclosure.

FIG. 12 is a block diagram of an example computer that can be operable to execute processes and methods in accordance with various aspects and embodiments of the subject disclosure. The example computer can be adapted to implement, for example, any of the various network equipment described herein, or a network slice group manager device, or other computing devices described herein.

FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network automation platform equipment comprising a processor, a cell data update comprising updated physical cell identifiers and root sequence indices for application to cells which are part of a cellular communication network;
   analyzing, by the network automation platform equipment, the cell data update in order to identify a collision, the collision comprising:
   a same physical cell identifier assigned to neighbor cells of the cells, or
   a same root sequence index assigned to the neighbor cells;
   determining, by the network automation platform equipment, a replacement physical cell identifier or a replacement root sequence index for a neighbor cell of the neighbor cells, wherein the replacement physical cell identifier or the replacement root sequence index is determined to avoid the collision; and
   communicating, by the network automation platform equipment, the replacement physical cell identifier or the replacement root sequence index in order to configure the neighbor cell according to the new physical cell identifier or the new root sequence index.

2. The method of claim 1, wherein the method is performed periodically in order to periodically correct other collisions in the cellular network other than the collision between the cells.

3. The method of claim 1, wherein the cell data update is received via an element management system coupled with radio access network elements that are part of the cellular communication network, and a first data store to store the cell data update from the element management system.

4. The method of claim 3, wherein the communicating comprises communicating the replacement physical cell identifier or the replacement root sequence index to the element management system.

5. The method of claim 1, further comprising collecting, by the network automation platform equipment, the cell data update by moving data from a first data store into a second data store.

6. The method of claim 5, wherein the analyzing comprises analyzing the cell data update in the second data store.

7. The method of claim 1, further comprising:
   analyzing, by the network automation platform equipment, the cell data update in order to identify a physical cell identifier confusion, the physical cell identifier confusion comprising a same physical cell identifier assigned to at least two second cells of the cells, which are both neighbors of a first cell of the cells;
   determining, by the network automation platform equipment, replacement physical cell identifiers for the at least two second cells, wherein the replacement physical cell identifiers are determined to avoid the physical cell identifier confusion; and
   sending, by the network automation platform equipment, the replacement physical cell identifiers in order to configure the at least two second cells according to the replacement physical cell identifiers.

8. The method of claim 1, wherein the analyzing comprises analyzing, by the network automation platform equipment, a portion of the cell data update corresponding to a subgroup of the cells.

9. The method of claim 1, wherein the determining comprises applying, by the network automation platform equipment, a stored policy rule.

10. A non-transitory machine-readable medium, comprising executable instructions that, when executed by a processor, facilitate performance of operations, comprising:

receiving a cell data update comprising updated physical cell identifiers for cells associated with a cellular communication network;

analyzing the updated physical cell identifiers in order to identify a physical cell identifier confusion, the physical cell identifier confusion comprising a same physical cell identifier assigned to a group of second cells of the cells, which are both neighbors of a first cell of the cells;

determining a new physical cell identifier for a second cell of the group of second cells, wherein the new physical cell identifier is determined to avoid the physical cell identifier confusion; and sending the new physical cell identifier in order to configure the second cell according to the new physical cell identifier.

11. The non-transitory machine-readable medium of claim 10, wherein at least one of the receiving of the cell data update, the analyzing of the updated physical cell identifiers, the determining of the new physical cell identifier, or the sending of the new physical cell identifier is performed periodically at a reconfigurable automation start time.

12. The non-transitory machine-readable medium of claim 10, wherein the cell data update is received via an element management system coupled with radio access network elements associated with the cellular communication network, and a database to store the cell data update from the element management system.

13. The non-transitory machine-readable medium of claim 12, wherein sending the new physical cell identifier comprises sending the new physical cell identifier to the element management system.

14. The non-transitory machine-readable medium of claim 10, wherein analyzing the cell data update in order to identify the physical cell identifier confusion comprises analyzing a portion of the cell data update corresponding to a defined subgroup of the cells.

15. The non-transitory machine-readable medium of claim 14, wherein the defined subgroup of the cells comprises an included subgroup among subgroups, wherein the subgroups are reconfigurably included or excluded for processing according to the operations.

16. Network automation platform equipment, comprising:
    a processor; and
    a memory that stores executable instructions that, when executed by the processor, facilitate performance of operations, comprising:

receiving a cell data update comprising updated parameters assigned to cells deployed as part of a cellular communication network;

analyzing the cell data update in order to identify a collision, the collision comprising a same root sequence index assigned to neighbor cells of the cells;

determining a replacement root sequence index for a neighbor cell of the neighbor cells of the cellular communication network, wherein the replacement root sequence index avoids the collision; and sending the replacement root sequence index in order to configure the neighbor cell according to the replacement root sequence index.

17. The network automation platform equipment of claim 16, wherein the network automation platform equipment is coupled via a local bus to other network automation platform equipment in a first cluster, and wherein the network automation platform equipment is coupled via a global bus to a second cluster of network automation platform equipment different than the first cluster.

18. The network automation platform equipment of claim 17, wherein functions of the first cluster and the second cluster are configurable via a self-organizing network user interface.

19. The network automation platform equipment of claim 17, wherein the first cluster and the second cluster are equipped to perform the operations.

20. The network automation platform equipment of claim 17, wherein the first cluster comprises a self-organizing network application manager to coordinate the operations according to a network automation platform policy.

* * * * *